United States Patent [19]

Deschamps et al.

[11] Patent Number: 5,059,569
[45] Date of Patent: Oct. 22, 1991

[54] PROCESS AND CATALYST FOR SELECTIVE REDUCTION OF NITROGEN OXIDES

[75] Inventors: Andre Deschamps, Noisy Le Roi; Claude Dezael, Maisons Laffitte; Claude Roux-Guerraz, Paris; Christine Travers, Rueil-Malmaison, all of France

[73] Assignees: Institut Francais Du Petrole, Rueil-Malmaison, France;

[21] Appl. No.: 299,168

[22] Filed: Jan. 19, 1989

[30] Foreign Application Priority Data

Jan. 19, 1988 [FR] France ................... 88 00635

[51] Int. Cl.$^5$ ............................................. B01J 29/20
[52] U.S. Cl. ......................................... 502/78; 502/74
[58] Field of Search ..................... 502/78, 74; 423/239

[56] References Cited

U.S. PATENT DOCUMENTS

| | | | |
|---|---|---|---|
| 4,473,535 | 9/1984 | Kittrell et al. | 423/239 |
| 4,663,300 | 5/1987 | Lester et al. | 502/66 |
| 4,727,217 | 2/1988 | Travers et al. | 585/739 |
| 4,910,004 | 3/1990 | Hamon et al. | 423/239 |

FOREIGN PATENT DOCUMENTS

| | | |
|---|---|---|
| 0234974 | 9/1987 | European Pat. Off. . |
| 286507 | 3/1988 | European Pat. Off. . |
| 2197815 | 3/1974 | France . |

Primary Examiner—Carl F. Dees
Attorney, Agent, or Firm—Millen, White & Zela

[57] ABSTRACT

The invention concerns, on one hand, a new zeolitic catalytic composition which comprises a small-pore mordenite present in the form of needles, exchanged with at least one metal chosen from the group consisting of cooper, vanadium, tungsten, iron, colbalt and molybdenum, and on the other hand, use of this catalytic composition as a catalyst for the reduction of nitrogen oxides by ammonia.

20 Claims, No Drawings

PROCESS AND CATALYST FOR SELECTIVE REDUCTION OF NITROGEN OXIDES

BACKGROUND OF THE INVENTION

The invention concerns a zeolitic catalytic composition and its use, in particular, in a process for selective reduction of nitrogen oxides contained, for example, in combustion fumes.

Nitrogen oxides, and nitric oxide in particular, are pollutant gases which form during combustion of carbonaceous matter such as coal, petroleum products and natural gas, in thermal power plants for example.

Various processes have been suggested to eliminate these noxious products of combustion gases, for example by absorption and by selective reduction to nitrogen and water vapor. The latter method, generally considered to be the most effective, uses ammonia in the presence of a catalyst as a selective reducer.

Numerous catalysts have been suggested for the realization of this reaction. A good summary of the present state of technology is given in the article by J. R. Kiovsky et al., Ind. Eng. Chem. Prod. Res. Dev. 1980, 19, 218-225.

Among these are:
  the noble metals such as platinum supported on alumina and silica-alumina,
  Cu, Fe, Cr and Ni compounds supported on alumina,
  V, W, Mo and Ce oxides supported on alumina, silica-alumina and titanium oxide,
  various natural and synthetic zeolites in proton form or exchanged with various cations, notably Cu.

Patent EP 234974 which describes large-pore mordenites and patent EP 141917 which mentions use of a ceramic molecular sieve, thus of an amorphous structure, illustrate the technological background, and U.S. Pat. No. 4,663,300, which contains a mordenite with titanium, and the summary Chemical Abstract, vol 87, No. 2, 11/7/1977, page 325, No. 10890 a, indicate use of a mordenite associated with clay and containing iron, chromium and/or vanadium.

Most of these catalysts present a number of disadvantages which limit their performance when they are used in the presence of combustion gases. These disadvantages are mainly:
  parasitic oxidation of sulfur dioxide to sulfur trioxide, leading to corrosion of plants,
  lack of stability with the course of time, notably in the presence of sulfur dioxide,
  oxidation of some of the ammonia by the oxygen contained in fumes which leads to overconsumption of ammonia. This is usually accompanied by formation of nitrogen oxides, and nitrous oxide $N_2O$ in particular, which prevents high elimination rates of nitrogen oxides being obtained.
  difficulty in obtaining exhaustive elimination of nitrogen oxides without notable leakage of ammonia into the fumes.

To remedy some of these disadvantages, various solutions have been suggested. Thus, the U.S. Pat. No. 4,473,535 shows that use of a mordenite-based catalyst exchanged with Cu allows better conversion of NO to be obtained than with a platinum-based catalyst on alumina, and that the former does not give rise to parasitic oxidation of $NH_3$ to NO when the temperature is increased. However, this patent does not provide any details concerning the other problems mentioned hereinabove, that is to say, leakage of $NH_3$, formation of $N_2O$, stability in the presence of $SO_2$ and formation of $SO_3$. Furthermore, the examples given relate exclusively to use of a Norton HZ 900 mordenite of the large-pore type. This is also the case in the patent FR 2197815.

SUMMARY OF THE INVENTION

The present invention is based on the discovery that another type of mordenite, a.k.a. small-pore, exchanged by different cations, presents a number of advantages in comparison to known catalysts, insofar as it does not present the disadvantages mentioned hereinabove.

The catalyst used in the present invention are prepared from a mordenite characterized by a Si/Al atomic ratio generally between 4 and 6. Its crystalline structure consists of $SiO_4$- and $AlO_4$-based tetrahedral chaining which generate two types of channels: channels with a dodecagonal opening (contour with 12 oxygens) and channels with an octogonal opening (contour with 8 oxygens).

Nonetheless, two types of mordenite exit which are distinguished by their adsorption properties: the large-pore form, always synthetic, which adsorbs molecules such as benzene (kinetic diameter $=6.6\times 10^{-10}$ m) and the small-pore form, natural or synthetic, which only adsorbs molecules whose kinetic diameter is less than about $4.4\times 10^{-10}$ m. These mordenites are also distinguished by their different morphologies, needles for small-pore mordenite, spherulites for large-pore mordenite, and structures: presence or not of faults. In the literature mentioned hereinabove, it is the large-pore mordenite that is used.

In the present invention, small-pore mordenite is used. These small-pore synthetic mordenites can be obtained by synthesis under the following conditions: temperature between about 200° and 300° C. and crystallization time of 5 to 50 hours.

The mordenite used for manufacture of the catalysts of the present invention is a small-pore mordenite whose content in sodium is generally between 4 and 6.5 per cent (weight) with respect to the dry mordenite, its Si/Al atomic ratio is generally between 4.5 and 6.5 and its unit cell volume between 2.80 and 2.77 $nm^3$. This mordenite only adsorbs molecules whose kinetic diameter is less than about $4.4\times 10^{-10}$ m.

In order to prepare the catalyst of the present invention, this mordenite can be used in sodium form or in ammonium form, dealuminated or not. In the case where it is used in dealuminated form, the mordenite is characterized by different specifications after treatment: a Si/Al atomic ratio between 5 and 100 and preferably between 5.5 and 50, a sodium content less than 0.2% by weight and preferably, less than 0.1% with respect to dry zeolite weight, a unit cell V, of the unit cell between 2.78 and 2.73 $nm^3$, and preferably between 2.77 and 2.74 $nm^3$, a benzene adsorption capacity greater than 5%; and preferably greater than 8% with respect to the weight of the dry solid (zeolite), a special morphology, that is to say a major part is in the form needles with a preferable average length of 5 microns ($5\times 10^{-6}$ m) whose hexagonal faces have a length of about 1 micron ($1\times 10^{-6}$ m) and a "height" of about 0.3 micron ($0.3\times 10^{-6}$ m).

Various methods exist to obtain a mordenite such as that defined hereinabove, from a small-pore mordenite. According to one of the preferred methods, the small-pore mordenite used is submitted to the following treatments: the sodium cations are exchanged with ammonium cations, by immersing the zeolite in a solution ionizable ammonium salt of a molarity generally greater than 0.5, at a temperature between 20° C. and 150° C. This exchange can be repeated several times. The product obtained in this way following cationic exchange can be washed then submitted to thermal treatment in the presence of water vapor, which can be carried out by calcination in a confined atmosphere (self steaming). The temperature is between 300° and 800° C. and preferably between 400° and 700° C., for a time usually greater than 10 minutes and preferably greater than 20 minutes. The calcination atmosphere contains less than 1%, and preferably less than 5%, of water vapor. In the case of calcination in a confined atmosphere, the atmosphere essentially consists of water and ammonia. The product obtained in this way is submitted to acid treatment aimed at extracting the aluminum from the solid. This treatment can be carried out by immersing the product in a strong mineral or organic acid with a normality between 0.1 and 12N, at a temperature between 20° and 150° C. and preferably between 80° and 150° C., for a time preferably greater than 10 minutes. The product having undergone acid treatment is then washed, with an acid for example, then washed with water and finally mixed with an appropriate matrix.

The mordenite in sodium, ammonium or proton form, dealuminated or not, is then exchanged with a cation chosen from the following metals: V, W, Fe, Co, Mo, Cu and preferably Cu. This operation is carried out using conventional methods in which the zeolite is contacted with an aqueous solution containing metallic cations, for example, a copper nitrate aqueous solution. The exchange ratio can be as low as 10% and as high as 100% of the capacity of exchange of mordenite but an exchange ration between 40and 80% of the latter is generally preferred. The exchanged mordenite is separated from the aqueous solution, washed with distilled water and dried.

The mordenite prepared in this way can be used either directly without any binding agent, by pelletizing, or after being mixed with a matrix comprising silica, alumina, silica-alumina, natural clays such as kaolin or bentonite, and titanium oxide. In the latter case of a matrix, content in mordenite of the catalyst obtained in this way should be greater than 10% in weight, and preferably greater than 40% in weight. The catalyst can be put in powder, bead, pellet, sheet or monolite form, using the techniques known to persons skilled in the art. A mordenite layer can also be deposited on the surface of a monolitic support by coating with an aqueous dispersion of said mordenite and a binding agent.

According to another procedure, cationic exchange of the mordenite can be carried out following shaping of the catalyst.

In the process of the invention, the gaseous current containing nitrogen oxides, such as the fumes of a thermal power plant, gas turbine or tail gas of a nitric acid plant, is mixed with ammonia and contacted with the catalyst.

In addition to nitrogen, the gas treated generally contains 50 to 1000 ppm in volume of nitrogen oxides, water vapor, carbon dioxide and oxygen at a concentration preferably greater than 1% in volume. It can also contain sulfur dioxide with a content generally between 50 and 2000 ppm in volume.

The quantity of ammonia injected depends on the quantity and nature of the nitrogen oxides present in the gas treated. It is generally from 0.8 to 1.4, and preferably from 0.9 to 1.1, mole of ammonia per mole of nitrogen oxides.

The space velocity used depends on the temperature and rate of elimination of nitrogen oxides desired. It is generally between 3000 and 100 000 hour$^{-1}$, and preferably between 5000 and 25000 hour$^{-1}$.

It has surprisingly been discovered that small-pore mordenite, such as that defined hereinabove, exchanged with various cations, notably copper, in comparison to large-pore mordenite shows different advantages concerning elimination of nitrogen oxides from industrial fumes, according to the method described hereinabove. In the presence of a gas containing sulfur dioxide, it catalyzes oxidation of sulfur dioxide to sulfur trioxide much less and has a more stable catalytic activity during the course of time vis-à-vis reduction of nitrogen oxides. Furthermore, it allows particularly high NO and $NO_2$ elimination rates, without notable leakage of ammonia into the purified gas and without emission of $N_2O$.

Treatment is usually carried out at a temperature from 200° to 450° C., preferably from 250° to 350° C.

When the gas treated contains sulfur dioxide, it is usually necessary to operate at a temperature greater than 300° C., and preferably greater than 330° C., in order to avoid deposit of ammonium sulfate on the catalyst, which leads to reduction in catalytic activity due to blocking of porosity.

In the case where the gas does not contain sulfur dioxide, for example the combustion gas of a natural gas, it is possible to operate at lower temperatures, for example 250° C.

It has been observed that under these conditions and in the presence of a gas containing water vapor, partially dealuminated, small-pore mordenite-based catalyst having Si/Al atomic ratios between 8 and 50, and preferably between 10 and 20, show an elimination activity of nitrogen oxides that is greater than that of non-dealuminated mordenite-based catalysts.

The following comparative examples illustrate the invention without limiting it in any way.

EXAMPLE 1

Comparative

A catalyst A is prepared from a large-pore mordenite HZ 900 (zeolon 900 H, NORTON CHEMICAL CORPORATION) marketed in hydrogen form. The mordenite is immersed in a 2M copper nitrate aqueous solution (100 cm$^3$ of solution per 20 g mordenite) for 2 hours at 20° C. The exchange is repeated twice, then the exchanged mordenite is washed, dried and calcined at 550° C. for 2 hours under air.

A mordenite whose Cu content is 7% in weight is thus obtained. This corresponds to an exchange ratio of exchangeable sites of about 93%.

The product is shaped in pellet form, 2 mm in diameter and 2 mm in thickness.

EXAMPLE 2

A catalyst B is prepared from a small-pore mordenite (reference: Alite 150, Société Chimique de la Grande Paroisse) in sodic form. Its chemical formula in the anhydrous state is Na $AlO_2$ $(SiO_2)_{5.5}$ and its benzene adsorption capacity is 1% in weight with respect to dry solid weight unit cell volume: 2.79 nm$^3$, sodium content 5.3% in weight, kinetic diameter of adsorbed molecules less than $3.8 \times 10^{-10}$).

The exchanged form was prepared on Cu and shaped according to the procedure in example 1. A mordenite containing 6.8% in weight of copper is thus obtained. This corresponds to an exchange ratio of exchangeable sites of 90%.

EXAMPLE 3

A catalyst C is prepared from the same small-pore mordenite as in example 2 (Alite 150) but in ammonium form. In order to do this, the mordenite in sodium form is treated with a 2M ammonium nitrate solution at 95° C. for two hours. The volume of solution used is 100 cm³ per 25 g of dry zeolite. This procedure is repeated three times and the product is then washed with water and dried. A mordenite in ammonium form is thus obtained whose sodium content is not greater than 0.1% in weight.

The mordenite is then exchanged with copper and shaped as in example 1. A mordenite containing 7.1% in weight of copper is thus obtained. This corresponds to an exchange ratio of exchangeable sites of 94%.

EXAMPLE 4

A catalyst D is prepared from small-pore mordenite (Alite 150), using the same procedure as in example 3 but the exchange with Cu is less extensive in order to obtain a mordenite containing 5.1% in weight of copper. This corresponds to an exchange ratio of exchangeable sites of 68%.

EXAMPLE 5

A catalyst E is prepared from small-pore mordenite. (Alite 150) but is submitted to previous dealumination treatment. In order to do this, the mordenite in sodium form is treated with a 2M ammonium nitrate solution at 95° C. for two hours. The volume of solution used is 100 cm³ per 25 g of dry zeolite.

This procedure is repeated three times and the product is then washed with water and submitted to calcination in a confined atmosphere (self steaming) at 600° C. for 2 hours. A mordenite in hydrogen form is thus obtained whose sodium content is about 0.1% in weight and atomic ratio of the Si/Al framework is equal to 12.

We proceed to preparation of the form exchanged with Cu and to shaping in pellet form as in example 1. A mordenite is finally obtained whose Cu content is 3.1% in weight. This corresponds to an exchange ratio of exchangeable sites of about 80%.

EXAMPLE 6

A catalyst F is prepared from a small-pore mordenite (Alite 150) by applying the same procedure as in example 5 until the calcination step at 600° C. inclusive. We then proceed to acid attack with 1.3N nitric acid by heating the product in the nitric solution under reflux for 2 hours (200 cm³ of solution per. 25 g of zeolite). The product is then filtered and washed with 0.1N nitric acid then with water. A mordenite in hydrogen form is thus obtained whose sodium content is about 0.03% in weight, an atomic ratio of the Si/Al framework of 12, free of alumina outside the network.

The mordenite is then exchanged with Cu and shaped as in example 1. A mordenite whose Cu content is 2.9% in weight is finally obtained. This corresponds to an exchange ratio of exchangeable sites of 74%.

EXAMPLE 7

A catalyst G is prepared according to the procedure in example 3 but instead of exchanging the mordenite with a copper nitrate solution, it is exchanged with a ferrous nitrate solution. A mordenite containing 5.3% in iron is finally obtained. This corresponds to an exchange ratio of exchangeable sites of about 80%.

EXAMPLE 8

Comparison with Example 7

A catalyst H is prepared according to the procedure in example 1 but instead of exchanging the large-pore mordenite HZ 900 with a copper nitrate solution, it is exchanged with a ferrous nitrate solution. A mordenite containing 5.5% in iron is obtained.

EXAMPLE 9

The catalysts described in examples 1 to 8 are tested under the following conditions:

20 g of catalyst are placed in a quartz reactor of a diameter of 2 cm, heated by an electric furnace. The gaseous mixture, containing 0 to 500 ppm volume of $SO_2$, 500 ppm volume of NO, 520 ppm volume of $NH_3$, 4% volume of oxygen, 10% volume of water vapor, 10% volume of $CO_2$ and the remainder being nitrogen, is introduced at the top of the reactor at a flow rate of 300 Nl/h. The resulting gas is analyzed using a mass spectrometer in order to determine NO, $N_2O$, $NH_3$, $SO_3$ contents.

The results obtained are given in the following table. They show that the catalysts of the invention (B, C, D, E, F), manufactured from a small-pore mordenite, used in the presence of fumes containing $SO_2$, have better performances and better stability with the course of time than catalyst A manufactured from large-pore mordenite. This is also the case for catalyst G vis-à-vis catalyst H, exchanged with iron.

Tests 4, 14, 17, 20, carried out in the presence of a gas that does not contain $SO_2$, show that catalysts made from a partially dealuminated mordenite are more effective at low temperatures than those prepared from non-dealuminated mordenite.

EXAMPLE 10

Tests 1 to 5 were repeated with mordenites exchanged with Co, Mo, V or W. The conclusions were found to be substantially similar.

| Catalyst | $SO_2$ (charge) ppm | T °C. | Time hours | Analysis of effluent gas | | | | Test |
|---|---|---|---|---|---|---|---|---|
| | | | | NO ppm | $N_2O$ ppm | $NH_3$ ppm | $SO_3$ ppm | |
| A | 500 | 330 | 10 | <5 | 20 | 15 | 20 | 1 |
| Large-pore M | " | " | 100 | 22 | 25 | 20 | 25 | 2 |
| Cu = 7% | " | " | 500 | 60 | 30 | 30 | 20 | 3 |
| Si/Al = 5,5 | 0 | 250 | 50 | 40 | <5 | 35 | — | 4 |
| B | 500 | 330 | 10 | 8 | <5 | 15 | <10 | 5 |
| Small-pore M | " | " | 90 | 10 | <5 | 20 | <10 | 6 |
| Cu = 6,8% | " | " | 600 | 12 | <5 | 20 | <10 | 7 |
| Si/Al = 5,5 | | | | | | | | |

-continued

| Catalyst | SO₂ (charge) ppm | T °C. | Time hours | Analysis of effluent gas | | | | Test |
|---|---|---|---|---|---|---|---|---|
| | | | | NO ppm | N₂O ppm | NH₃ ppm | SO₃ ppm | |
| C | 500 | 330 | 10 | <5 | <5 | 8 | <10 | 8 |
| Small-pore M | " | " | 95 | <5 | <5 | 12 | <10 | 9 |
| Cu = 7,1% | " | " | 540 | <5 | <5 | 10 | <10 | 10 |
| Si/Al = 5,5 | | | | | | | | |
| D | 500 | 330 | 10 | <5 | <5 | <5 | <10 | 11 |
| Small-pore M | " | " | 100 | <5 | <5 | <5 | <10 | 12 |
| Cu = 5,1% | " | " | 500 | <5 | <5 | <5 | <10 | 13 |
| Si/Al = 5,5 | 0 | 250 | 50 | 20 | <5 | 25 | — | 14 |
| E | 500 | 330 | 10 | <5 | <5 | <5 | <10 | 15 |
| Small-pore M | " | " | 100 | <5 | <5 | <5 | <10 | 16 |
| Cu = 3,1% | 0 | 250 | 50 | <5 | <5 | <5 | — | 17 |
| Si/Al = 12 | | | | | | | | |
| F | 500 | 330 | 10 | <5 | <5 | <5 | <10 | 18 |
| Small-pore M | " | " | 100 | <5 | <5 | <5 | <10 | 19 |
| Cu = 2,9% | 0 | 250 | 50 | <5 | <5 | <5 | — | 20 |
| Si/Al = 12 | | | | | | | | |
| G | 500 | 330 | 10 | 35 | 10 | 12 | 15 | 21 |
| Small-pore M | " | " | 100 | 40 | 12 | 15 | 18 | 22 |
| Fe = 5,3% | | | | | | | | |
| Si/Al = 5,5 | | | | | | | | |
| H | 500 | 330 | 10 | 40 | 20 | 25 | 22 | 23 |
| Large-pore M | " | " | 100 | 80 | 25 | 30 | 25 | 24 |
| Fe: 5,5% | | | | | | | | |
| Si/Al: 5,5 | | | | | | | | |

What is claimed is:

1. A zeolitic catalytic composition comprised of a small-pore mordenite exchanged with at least one metal chosen from the group consisting of copper, vanadium, tungsten, iron, cobalt and molybdenum, the small-pore mordenite used for the exchange being the sodium, ammonium or protonic form, a major part of the mordenite being present in needle form and having the property of only adsorbing molecules of a kinetic diameter less than $4.4 \times 10^{-10}$ m, said mordenite being dealuminated at least in part so as to improve performance of the catalyst in removal of NO, $N_2O$, $NH_3$, and $SO_3$ from effluent gases.

2. Composition according to claim 1, the exchange having been carried out with copper.

3. Composition according to claim 1 wherein the form is the ammonium form.

4. Composition according to claim 1 wherein the form is the proton form.

5. Composition according to claim 1 containing a mordenite whose Si/Al atomic ratio is from 12 to 50, whose sodium content is less than 0.2% by weight, which possesses a unit cell volume between 2.87 and 2.73 nm³ and a benzene adsorption capacity greater than 5% by weight.

6. Composition according to claim 1, the exchange having been carried out under conditions such that an exchange ratio from 10 to 100% of the exchange capacity of the mordenite is obtained.

7. Composition according to claim 1 wherein the form is sodium.

8. Composition according to claim 3, the exchange having been carried out with copper.

9. Composition according to claim 4, the exchange having been carried out with copper.

10. Composition according to claim 8, the exchange having been carried out with copper.

11. Composition according to claim 5, the exchange having been carried out with copper.

12. Composition according to claim 6, the exchange having been carried out with copper.

13. Composition according to claim 5, the exchange having been carried out under conditions such that an exchange ratio from 10 to 100% of the exchange capacity of the mordenite is obtained.

14. Composition according to claim 11, the exchange having been carried out under conditions such that an exchange ratio from 10 to 100% of the exchange capacity of the mordenite is obtained.

15. Composition according to claim 11, the exchange having been carried out under conditions such that an exchange ratio from 40 to 80% of the exchange capacity of the mordenite is obtained.

16. A zeolitic catalytic composition comprised of a small-pore mordenite exchanged with at least one metal chosen from the group consisting of copper, vanadium, tungsten, iron, cobalt and molybdenum, the small-pore mordenite used for the exchange being the sodium, ammonium or protonic form, a major part of the mordenite being present in needle form and having an Si/Al of 12-100 and the property of only adsorbing molecules of a kinetic diameter less than $4.4 \times 10^{-10}$ m.

17. A composition according to claim 16, wherein the Si/Al of the mordenite is 20-100.

18. A composition according to claim 16, wherein the zeolite is exchanged with at least one metal chosen from the group consisting of vanadium, tungsten, iron, cobalt, and molybdenum.

19. A zeolitic catalytic composition comprised of a small-pore mordenite exchanged with at least one metal chosen from the group consisting of vanadium, tungsten, iron, cobalt and molybdenum, the small-pore mordenite used for the exchange being the sodium, ammonium or protonic form, a major part of the mordenite being present in needle form and having the property of only adsorbing molecules of a kinetic diameter less than $4.4 \times 10^{-10}$ m.

20. A zeolitic catalytic composition comprised of a small-pore mordenite exchanged with at least one metal chosen from the group consisting of copper, vanadium, tungsten, iron, cobalt, and molybdenum, the small-pore mordenite used for the exchange being the sodium, ammonium, or protonic form, a major part of the mordenite being present in needle form and having the property of only adsorbing molecules of a kinetic diameter less than $4.4 \times 10^{-10}$ m.

* * * * *